United States Patent
Inoue et al.

(10) Patent No.: US 7,338,128 B2
(45) Date of Patent: Mar. 4, 2008

(54) SEAT BACK LOCK

(75) Inventors: Hisashi Inoue, Nagoya (JP); Hiroshi Morinaga, Yokohama (JP); Masahito Minoura, Okazaki (JP); Shinji Suzuki, Miyoshi-cho (JP); Keiichi Kondo, Chiryu (JP)

(73) Assignee: Mitsui Mining and Smelting Co., Ltd. (JP)

( * ) Notice: Subject to any disclaimer, the term of this patent is extended or adjusted under 35 U.S.C. 154(b) by 93 days.

(21) Appl. No.: 11/336,326

(22) Filed: Jan. 20, 2006

(65) Prior Publication Data
US 2006/0170270 A1 Aug. 3, 2006

(30) Foreign Application Priority Data
Jan. 20, 2005 (JP) ............................. 2005-012699

(51) Int. Cl.
*B60N 2/36* (2006.01)
(52) U.S. Cl. ................................. 297/378.13
(58) Field of Classification Search ............ 297/378.13
See application file for complete search history.

(56) References Cited

U.S. PATENT DOCUMENTS 6,786,551 B2 * 9/2004 Brewer et al. ...... 297/378.13 X
6,793,285 B1 * 9/2004 Tame ................ 297/378.13 X
6,857,703 B2 * 2/2005 Bonk ................ 297/378.13 X
2004/0007909 A1 * 1/2004 Bonk ..................... 297/378.13
2005/0194826 A1 * 9/2005 O'Callaghan et al. . 297/378.13

FOREIGN PATENT DOCUMENTS

JP 8-119010 5/1996
JP 2604685 3/2000

* cited by examiner

*Primary Examiner*—Rodney B. White
(74) *Attorney, Agent, or Firm*—Ostrolenk, Faber, Gerb & Soffen, LLP (57) ABSTRACT

A seat back lock is included in a seat back of a vehicle. A knob is provided at the top of the seat back. A passenger in the vehicle pushes down the knob to cause the seat back to move from a standing position to a folding position on a seat. In the standing position, a striker extending from the body of the vehicle engages with a hook of the seat back lock. The seat back lock comprises a binding lever and a warning lever connected to the knob. Whenever the strike engages with the hook, the binding lever directly contacts the striker. If the striker incompletely engages with or disengages from the hook, the knob is pulled down by the warning lever to expose an indicator to permit the passenger to visually recognize it.

17 Claims, 7 Drawing Sheets

SEAT BACK LOCK

BACKGROUND OF THE INVENTION

The present invention relates to a seat back lock and especially to a seat back lock in a vehicle to enable a seat back to stand up.

A known seat lock in a vehicle comprises a locking mechanism having a locking lever mounted to a seat back of a rear seat and engagable with a striker of the vehicle and a release lever engagable with the locking lever; and a knob connected to the release lever, unlatching of the knob allowing the release lever to move from a locked position to an unlocked position to disengage the striker from the locking lever to allow the seat back to move from a standing position to a folding position.

As disclosed in Japanese. Utility Model Registration No.2,604,685, when a locking lever is engaged with a striker, a knob is moved to the first position, and when the locking lever is disengaged from the striker, the knob is allowed to move down from the first position to the second position, so that an indicator near the knob is exposed to enable a passenger to visually recognize a position of the knob and to confirm engagement of the locking lever with the striker easily.

However, in the seat lock in a vehicle, travel of the knob between the first and second positions is directly connected to travel of the release lever. Thus, unlatching of the knob causes the release lever to move from a locked position to an unlocked position and the release lever has to be kept in the unlocked position even though the locking lever disengages from the striker thereby resulting in complicate structure of the seat lock.

Distance of the travel of the knob between the first and second positions is determined by distance of unlatching of the release lever between a latched position and an unlatched position. Accordingly, the travel of the knob between the first and second positions becomes the same as unlatching distance to make it impossible to determine movement of the knob between the first and second positions.

SUMMARY OF THE INVENTION

In view of the foregoing disadvantages, it is an object of the present invention to provide a seat back lock in a vehicle to enable movement of a knob between the first and second positions to be determined optionally to make it possible for a passenger to visually recognize a position of the knob.

BRIEF DESCRIPTION OF THE DRAWINGS

The above and other features and advantages of the present invention will become more apparent from the following description with respect to an embodiment as shown in appended drawings wherein.

DETAILED DESCRIPTION OF PREFERRED EMBODIMENT

In the following description, the right and left sides are deemed the front and rear respectively in each view.

Figure 1:
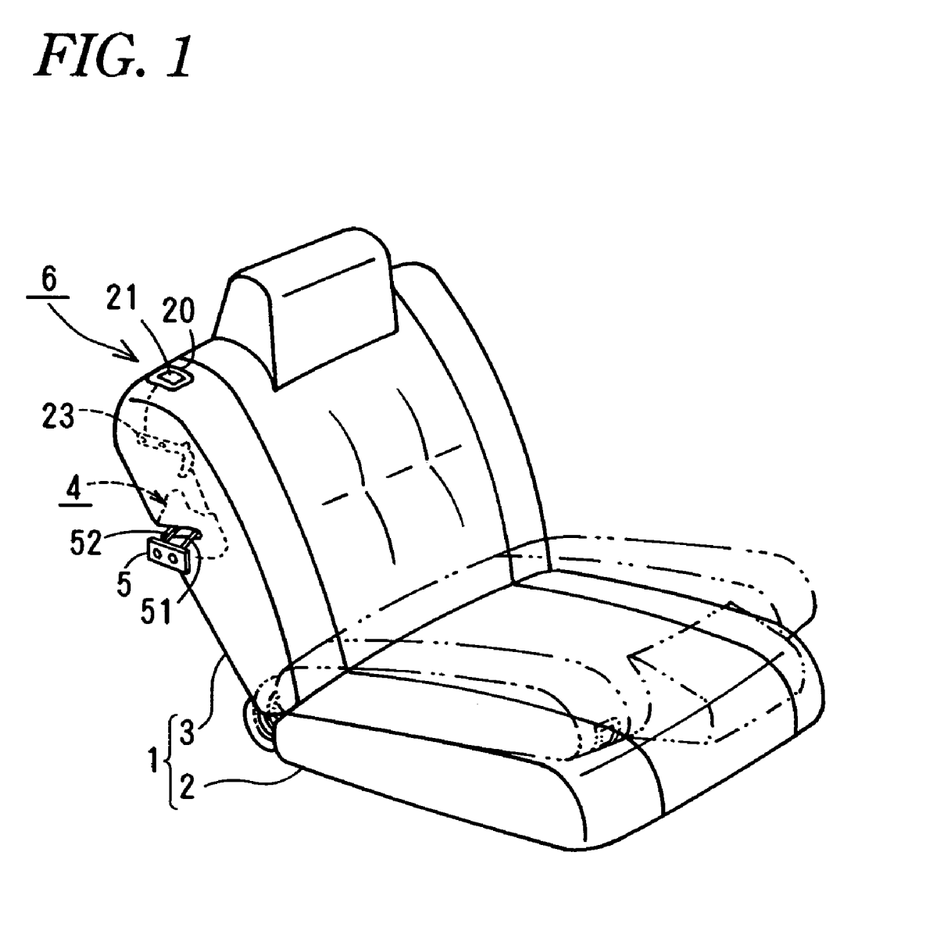
FIG. 1 is a perspective view of a rear seat in a vehicle in which a seat back lock according to the present application is used.

As shown in FIG. 1, a rear seat 1 comprises a seat cushion 2 installed on the floor of a vehicle; and a tiltable seat back 3 pivotally mounted between a standing position as shown by solid lines and a folding position as shown by dotted lines.

A locking mechanism 4 is mounted in the side near the shoulder of the seat back 3, and a striker 5 mounted to a vehicle body engages with a hook 8 which will be described later, so that the seat back 3 can be held between the first standing position and the second standing position slightly tilted from the first standing position. Unlocking operation at the upper shoulder of the seat back 3 allows the hook 8 to disengage from the striker 5 enabling the seat back 3 to move from each of the standing positions to a folding position.

The striker 5 is shaped like "U" and has the first engagement portion 51 at the front and the second engagement portion 52 at the rear. The first engagement portion 51 is engaged with the hook 8 of the locking mechanism 4 as below to enable the seat back 3 to be held in the first standing position, and the first engagement portion 51 and the second engagement portion 52 are both engaged with the hook 8 to enable the seat back 3 to be held in the second standing position.

The operating unit 6 is fixed to the upper shoulder of the seat back 3 and comprises an upright rectangular member 20 and an operating knob 21 vertically movable in the guide member 20.

The operating knob 21 is connected via the first connecting member 24 to the rear end of a bell crank 23 pivotally mounted to a bracket (not shown) at the upper end of the locking mechanism 4. The operating knob 21 is vertically movable in the first position in which the upper surface is almost flush with the guide member 20 in FIGS. 2 and 3: in the second position in which it is a little retracted in the guide member 20 in FIGS. 4 and 5; and in the third position in which it is retracted deeper than the second position un FIG. 6.

The first position reveals that the hook 8 of the locking mechanism 4 firmly engages with the striker 5; the second position reveals that the hook 8 of the locking mechanism 4 disengages from or incompletely engages with the striker 5; and the third position is an unlocked position in which the hook 8 of the locking mechanism 4 completely disengages from the striker 5.

On the upper rear part of the inner circumferential surface of the guide member 20, there is provided an indicator 201 with a color different from the guide member 20 or a word "UNLOCK". The indicator 201 is concealed by the knob 21 when the knob is in the first position; while it is exposed when the knob 21 is in the second and third positions, to give a passenger a notice that the hook 8 of the locking mechanism 4 disengages from the striker 5.

Figure 2:
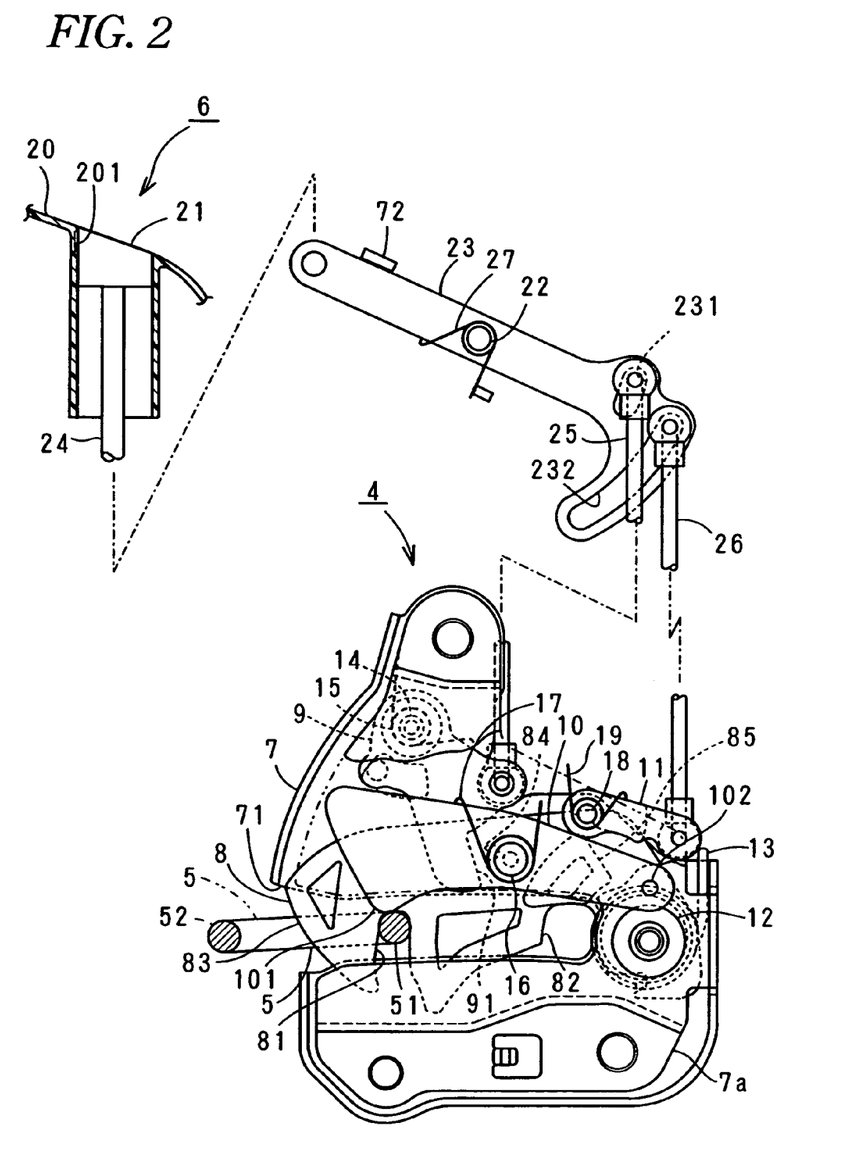
FIG. 2 is a side view in which a seat back is held in the first standing position.
Figure 3:
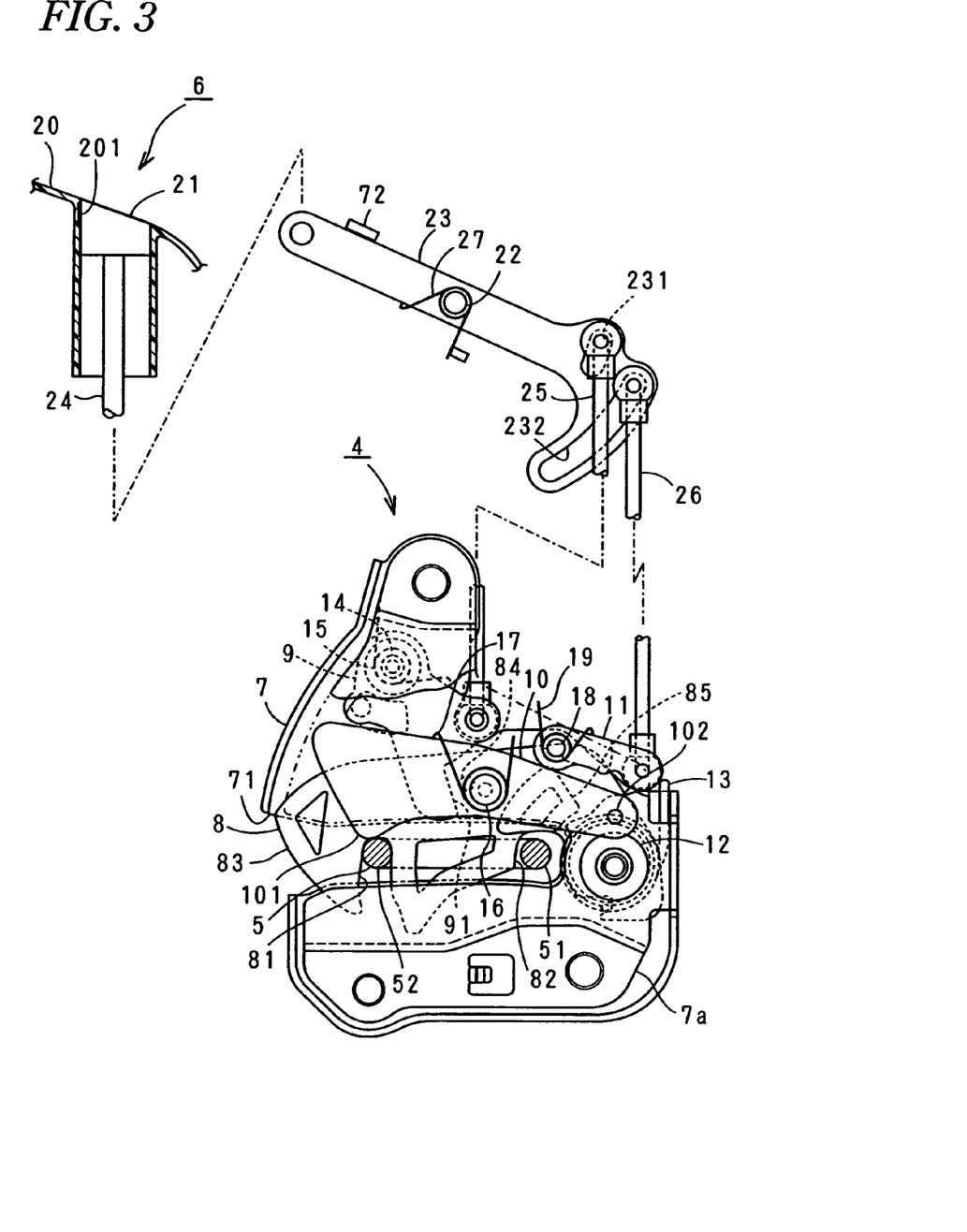
FIG. 3 is a side view in which the seat back is held in the second standing position.
Figure 4:
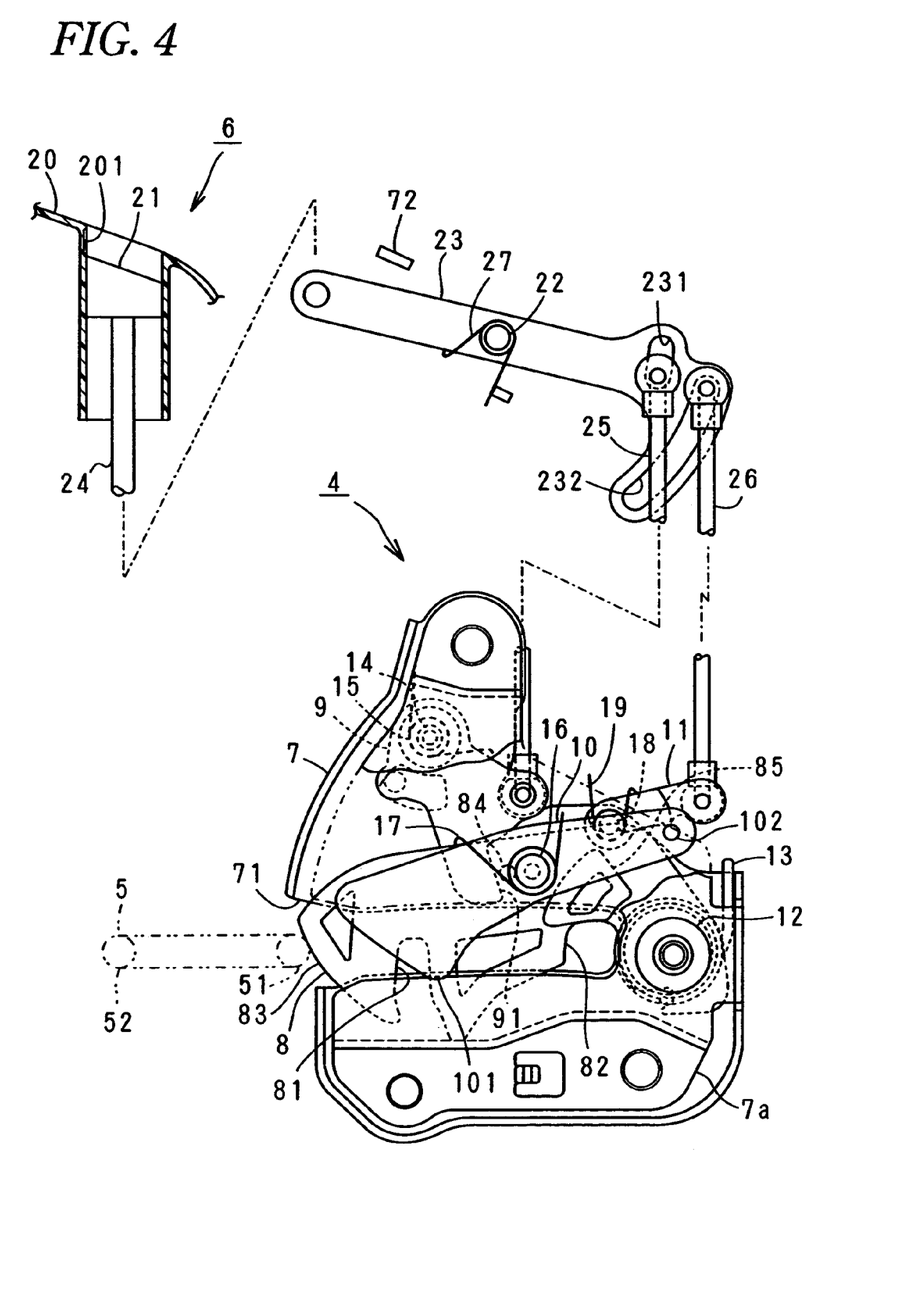
FIG. 4 is a side view of the seat back lock when a striker is disengaged.
Figure 5:
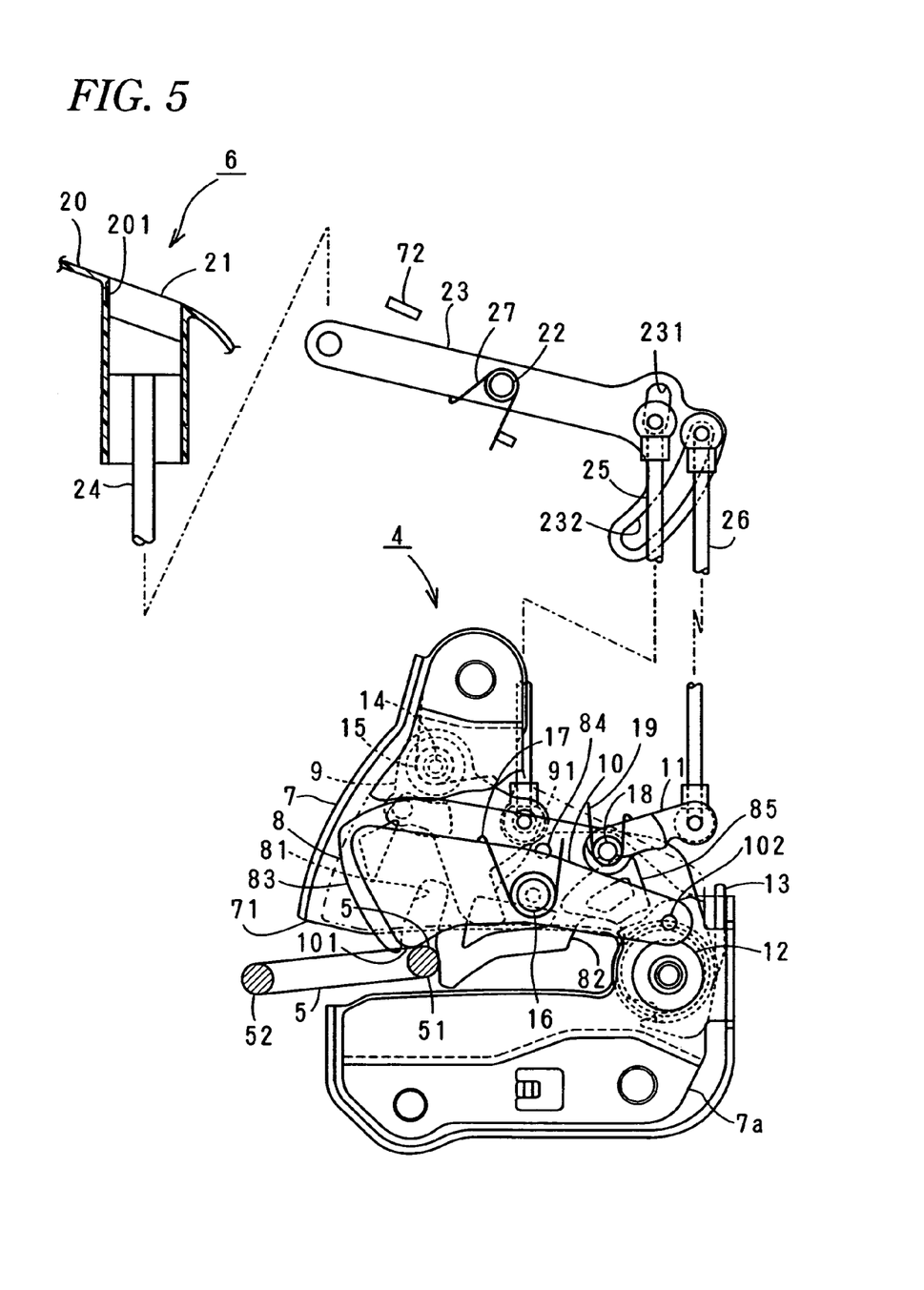
FIG. 5 is a side view of the seat back lock in incomplete disengagement.

The bell crank 23 is pivotally mounted to the bracket on a pivot 22 and urged by a third spring 27 in a clockwise direction. As shown in FIGS. 2 and 3, the bell crank 23 is held in the first position corresponding to the first position of the knob 21 with engagement on a stopper 23 of the bracket and engaged on the knob 21 to turn to the second position corresponding to the second position of the knob 21 which turns in an anticlockwise direction as shown in FIGS. 4 and 5 and to the third position corresponding to the third position of the knob 21 which further turns in an anticlockwise direction from the second position.

The knob 21 may be held at the first position on a projection (not shown) at the upper end of the inner circumferential surface of the guide member 20 by resilient force of the knob 21.

At the front end of the bell crank 23, the first arcuate hole 231 and the second arcuate hole 232 are positioned on a circle around the pivot 22.

In the first arcuate hole 231, the upper end of the second connecting member 25 is slidably engaged to produce play corresponding to travel between the first and second positions of the knob. Along an operation transmitting path between the knob 21 and the second connecting member 25, the play corresponding to the travel between the first and second positions is formed to prevent the travel of the knob between the first and second positions from being transmitted to the second connecting member 25.

In the second arcuate hole 232, the upper end of the third connecting member 26 is slidably engaged to allow play corresponding to travel of the knob between the first and third positions. Along an operation transmitting path between the knob 21 and the third connecting member 26, the play corresponding to the travel between the first and third positions of the knob 21 is formed to prevent the travel of the knob 21 between the first and third positions from being transmitted to the third connecting member 26.

The lower end of the second connecting member 25 is connected to an opening lever 9 described later, and the lower end of the third connecting member 26 is connected to a warning lever 11 constituting a detecting unit described later. As a result, the knob 21 is allowed to relate to the warning lever 11 and the opening lever 9 via the bell crank 23.

The locking mechanism 4 will be described with respect to FIGS. 2 to 6. The locking mechanism 4 comprises a base plate 7 with a screw (not shown) in the seat back; the hook 8 engagable with the striker 5; an opening lever 9 connected to the lower end of the second connecting member 25; and a detecting unit that comprises a binding lever 10 variable in position depending on engagement or disengagement of the striker 5 with or from the hook 8 and a warning lever 11. FIGS. 2 to 6 are partially cut-away views showing the base plate 7 to which a cover plate 7a is fixed.

When the seat back 3 is moved to a standing position, the base plate 7 has a striker-introducing groove 71 in an almost horizontal position in which first and second engagement portions 51,52 of the striker 5 can engage.

The hook 8 is pivotally mounted at the front end to the cover plate 7a on a pivot 12 and urged by the fourth spring 13 wound on the pivot 12 in an anticlockwise direction to allow the hook 8 to turn to a waiting position where the striker 5 disengages in FIG. 4; to an engagement position where the striker 5 engages in FIGS. 2 and 3 almost the same as the waiting position; and to an unlocked position where the hook 8 turns from the engagement position in a clockwise direction against force of the fourth spring 13. The present invention comprises the locking mechanism 4 in which the hook 8 has almost the same engagement and waiting positions.

In the hook 8 over the striker-introducing groove 71, along an introducing direction of the striker 5, there are formed the first engagement groove 18 at the rear side in which the first and second engagement portions 51,52 of the striker 5 are selectively engagable, and the second engagement groove 82 at the front side in which the first engagement portion 51 of the striker 5 is engagable.

To make the seat back 3 to stand up from the folding position, the first engagement portion 51 of the striker 5 is engaged in the striker-introducing groove 71 to get in touch with a curved edge 83 of the hook 8 to allow the hook 8 to turn against the resilient force from the waiting position to the unlocked position forcedly. Then, the first engagement portion 51 of the striker 5 is engaged in the first engagement groove 81 to allow the hook 8 to turn to the engagement position by force of the fourth spring 13 and to allow the first engagement portion 51 to engage in the first engagement groove 81 of the striker 5. Thus, the seat back 3 is held in the first standing position.

The first engagement portion 51 of the striker 5 further comes into the striker-introducing groove 71 to allow the first engagement portion 51 to engage in the second engagement groove 82 of the hook 8 and to allow the second engagement portion 52 to engage in the first engagement groove 81 thereby holding the seat back 3 in the second standing position.

Figure 6:
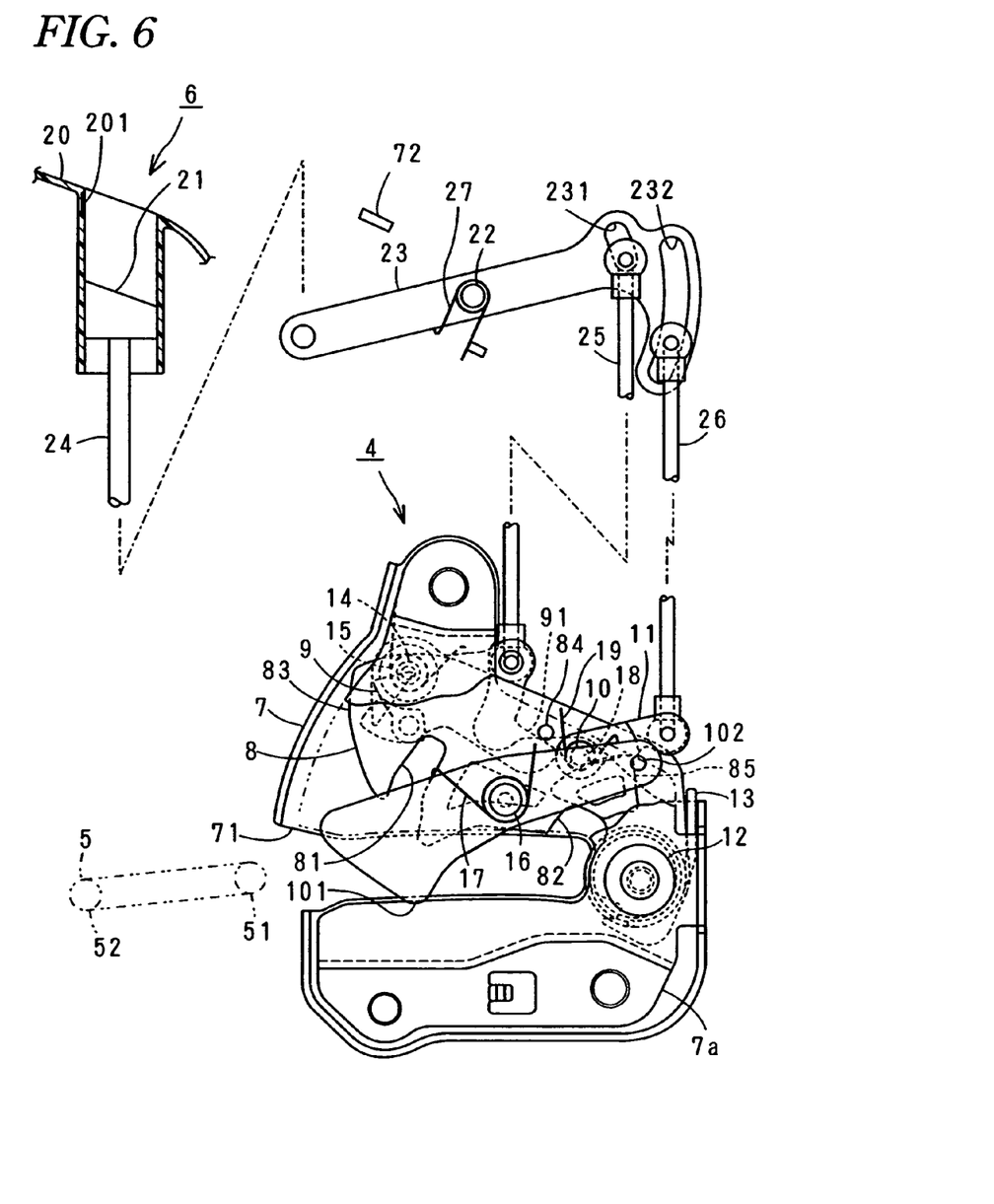
FIG. 6 is a side view of the seat back lock in unlocking.
Figure 7:
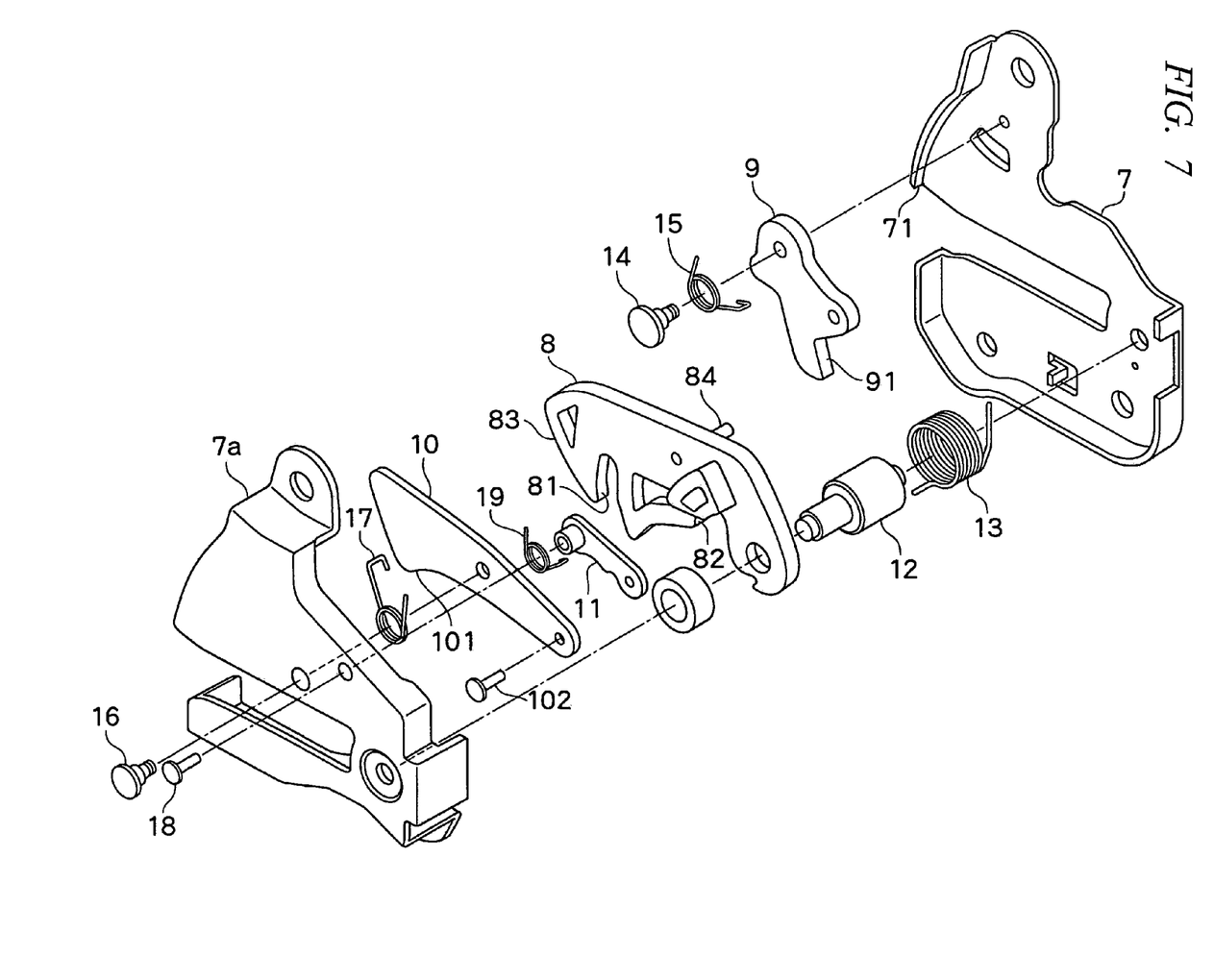
FIG. 7 is an exploded perspective view of the latch mechanism shown in FIGS. 2-6.

The opening lever 9 is pivotally mounted to the base plate 7 on the pivot 14 and connected to the lower end of the second connecting member 25. By unlocking the knob 21 to the third position, the opening lever 9 is allowed to turn against the fifth spring 15 from the stopping position in FIGS. 2 and 3 to the unlocked position in FIG. 6. With turning of the opening lever 9 to the unlocked position, as shown in FIG. 6, the front edge of a lower arm 91 contacts a rear projection 84 of the hook 8 to allow the hook 8 to turn from the engagement portion to the unlocked position. The arm 91 of the opening lever 9 is allowed to contact the rear projection 84 of the hook 8 only when the opening lever 9 turns in the anticlockwise direction.

The binding lever 10 is pivotally mounted to the cover plate 7a on a pivot 16 and urged by the first spring 17 in an anticlockwise direction. Instead, the binding lever 10 may be pivotally mounted to the base plate 7. When the first and second engagement portions 51, 52 of the striker 5 are disengaged from the first engagement groove 81 of the hook 8 or when the seat back 3 is in the folding position, the binding lever 10 is in the unlocked position in FIG. 4. When the first and second engagement portions 51, 52 of the striker 5 are completely engaged in the second engagement groove 82 of the hook 8 or when the seat back 3 is held in the first or second standing position, as shown in FIGS. 2 and 3, the binding lever 10 is engaged with the first engagement portion 51 or the second engagement portion 52 to enable the binding lever 10 against force of the first spring 17 to move to the locked position from the unlocked position.

When the binding lever 10 is in the locked position, a detecting projection 101 of the binding lever 10 is engaged with the first engagement portion 51 or the second engagement portion 52 of the striker 5 engaging with the first engagement groove 81 of the hook 8, thereby preventing the striker 5 from wobbling by force of the first spring 17.

The warning lever 11 is pivotally mounted to the cover plate 7a on a pivot 18 and connected at the front end to the lower end of the third connecting member 26 to turn between the unlocked position in FIGS. 4 to 6 and the locked position in FIGS. 2 and 3.

When the binding lever 10 is in the unlocked position, as shown in FIG. 4, the projection 102 at the front end of the binding lever 10 contacts the lower edge of the warning lever 11 to allow the warning lever 11 to be positioned in the unlocked position against resilient force of the second spring 19 which urges the warning lever 11 in a clockwise direction. When the binding lever 10 is in the locked position, as shown in FIGS. 2 and 3, the projection 102 of the binding lever 10 is moved downwards to go away from the lower edge of the warning lever 11. Accordingly, the warning lever 11 is turned from the unlocked position in a clockwise direction by resilient force of the second spring 19 and held in the locked position in which the warning lever 11 contacts the base plate 7.

When the warning lever 11 is moved to the locked position, the third connecting member 26 moves downwards to allow the bell crank 23 to move to the first position and the knob 21 to the first position. When the warning lever 11 is moved to the unlocked position, the third connecting member 26 moves upwards to allow the bell crank 23 to move to the second position against force of the third spring 27. Accordingly, the knob 21 is moved to the second position.

As shown in FIG. 5, when engagement is incomplete or when the hook 8 stops in an incomplete engagement position between the engagement position and the unlocked position to allow the first engagement groove 81 to engage with the first engagement portion 51 of the striker 5, with motion of the hook 8 to incomplete engagement position, a front projection 85 on the side surface of the hook 8 comes into a moving track of the warning lever 11 to engage on the lower edge of the warning lever 11 to allow the warning lever 11 to be held in the unlocked position. Thus, if incomplete engagement occurs, the binding lever 10 is in the locked position, but the warning lever 11 is held in the unlocked position to enable the knob 21 to move the second position.

An unlocked condition of the detecting unit 10,11 means that the binding lever 10 and warning lever 11 are both in the unlocked position, and a locked condition of the detecting unit 10,11 means that the binding lever 10 and warning lever 11 are both in the locked position.

In the incomplete engagement as shown in FIG. 5, when the binding lever 10 is in the locked position and when the warning lever 11 is in the unlocked position, the detecting unit 10,11 become the unlocked condition. Thus, when the detector 10,11 are in the locked condition, the knob 21 is moved to the first position. When they are in the unlocked condition, the knob 21 moves to the second position.

As mentioned above, in the locking mechanism 4, in addition to the hook 8, the first and second engagement portions 51,52 of the striker 5 is disengaged from the first engagement groove 81 of the hook 8, it changes to the unlocked condition. The locking mechanism 4 comprises the detecting unit 10,11 variable to the locked condition different from the unlocked condition by engagement with the first engagement portion 51 of the striker 6 when the hook 8 is in the engagement position. The knob 21 is related to the detecting units 10,11 so as to move between the first position corresponding to the locked condition of the detecting unit 10,11 depending on variation of the detecting unit 10,11 and the second position corresponding to the unlocked condition of the detecting unit 10,11 to enable movement between the first and second positions of the knob 21 to be determined optionally based on displacement of the detecting unit 10,11 and to enable the knob 21 to surely move between the first and second positions. Watching the position of the knob 21 and the indicator 201 permits the engagement of the hook 8 with the striker 5 to be confirmed easily.

Operation of the seat back lock according to the present invention will be described. When the seat back 3 is held in the first standing position, the first engagement portion 51 of the striker 5 is engaged with the first engagement groove 81 of the hook 8 as shown in FIG. 2. When the seat back 3 is held in the second standing position, the first engagement portion 51 and second engagement portion 51 of the striker 5 engage in the second and first engagement grooves 82,81 respectively. In this condition, the detecting unit 10,11 are in the locked condition and the knob 21 is in the first position. Thus, the passenger visually recognizes without great difficulty that the upper surface of the knob 21 is coplanar with the guide member 20 to make sure that the engagement portions 51,52 of the striker 5 firmly engage in the engagement grooves 81,82 of the hook 8. The detecting portion 101 of the binding lever 10 is engaged with the first or second engagement portion 51,52 of the striker 5 by resilient force to prevent vibration of the striker 5.

When the first or second engagement portion 51,52 of the striker 5 does not completely engage in the first engagement groove 81 or when the incomplete engagement occurs in FIG. 5 though the seat back 3 is in the first or second standing position, the binding lever 10 is in the locked position, but the front projection 85 of the hook 8 is engaged on the lower edge of the warning lever 1 to hold the warning lever in the unlocked position. Thus, the detecting unit 10,11 is in the unlocked condition and the knob 21 moves in the second position. As a result, it is visually recognized that the knob 21 is retracted from the guide member 20 in the second position and that the indicator 201 is exposed thereby enabling the incomplete engagement to be confirmed readily.

In order to move the seat back 3 in the first and second standing positions to the folding position, the knob 21 is unlocked and pressed down from the first position in FIGS. 2 and 3 to the third position in FIG. 6 through the second position. So the bell crank 23 turns against force of the third spring 27 from the first position to the third position through the second position to allow the opening lever 9 to turn from the waiting position to the unlocked position. With rotation of the opening lever 9 to the unlocked position, the hook 8 is rotated from the engagement position to the unlocked position to allow the engagement grooves 81,82 to disengage from the engagement portions 51,52 of the striker 5. In this condition, the seat back 3 is permitted to turn forwards to enable it to be in the folding position.

When the knob 21 is pressed down from the first position to the third position, the knob 21 and the warning lever 11 are connected to each other with play corresponding to travel between the first and third positions of the knob 21, so that movement of the knob 21 between the first and third positions is not transmitted to the warning lever 11. As a result, unnecessary motion of the warning lever 11 and binding lever 10 is avoided to enable engagement between the hook 8 and the striker 5 to be detected certainly.

When the seat back 3 is moved to the folding position, the engagement portions 51,52 of the striker 5 is disengaged from the engagement grooves 81,82 of the hook 8 to move the detecting unit to the unlocked position. The knob 21 in the second position is retracted in the guide member 20 thereby preventing the knob 21 from damaging to the surface of the front sheet (not shown).

The seat back 3 is allowed to stand up from the folding position to allow the first engagement portion 51 of the striker 5 to come into the striker-introducing groove 71 to cause the binding lever 10 against resilient force of the first spring 17 to move from the unlocked position to the locked position. After the hook 8 forcedly turns from the waiting position to the unlocked position against resilient force of the fourth spring 13, it is turned to the engagement position by resilient force of the fourth spring 13 as shown in FIG. 2 to allow the first engagement groove 81 to engage with the first engagement portion 51 of the striker 5. Thus, the seat back 3 is held in the first standing position and the knob 21 is moved from the second position to the first position.

The knob 21 and the opening lever 9 are connected to each other with play corresponding to travel between the first and second positions of the knob 21, so that movement of the knob 21 from the second position to the first position is not transmitted to the opening lever 9 and the hook 8. As a result, even though the knob 21 is moved to the first or second position, the hook 8 can always be held in the engagement position including the waiting position.

In order to move the seat back 3 to the second standing position, the first engagement portion 51 of the striker 5 is further introduced into the striker-introducing groove 71 to allow the first engagement portion 51 and the second engagement portion 51 to engage in the second engagement groove 82 and the first engagement groove 81 respectively.

The present invention is not limited to the foregoing embodiment. Various changes and modifications may be made by a person skilled in the art without departing from the scope of claims wherein:

What is claimed is:

1. A seat back lock for locking and unlocking a seat back in a vehicle, comprising:
    a striker mounted to a body of the vehicle, the striker having a first engagement portion at a first end of the striker and a second engagement portion at a second end of the striker;
    a locking mechanism mounted in the seat back and having a hook that is engagable with the striker to allow the seat back to be held in a standing position, the hook having a first engagement groove and a second engagement groove, wherein at least one of the first and second engagement portions of the striker is engagable in at least one of the first and second grooves of the hook to allow the seat back to be held in the standing position, the locking mechanism further including a detecting unit detecting incomplete engagement and disengagement between the striker and the hook; and
    an operating unit provided on a top of the seat back and having an operating knob that can be pushed down to allow the seat back to move from the standing position to a folding position on a seat, said operating knob being operable when the detecting unit detects incomplete engagement or disengagement between the striker and the hook.

2. A seat back lock as claimed in claim 1 wherein the locking mechanism further comprises a cover plate and a base plate covered with the cover plate, the hook being pivotally mounted to the cover plate with a spring positioned between the base plate and the cover plate.

3. A seat back lock as claimed in claim 2 wherein the detecting unit comprises a binding lever and a warning lever, the binding lever being pivotally mounted to one of the base plate and the cover plate with a second spring, and the warning lever being pivotally mounted to the base plate with a third spring, a rear end of the binding lever contacting the striker against force of the second spring when the striker engages with the hook, the warning lever being connected to the knob.

4. A seat back lock as claimed in claim 3 wherein the hook has a front projection operable to engage a lower edge of the warning lever to push up the warning lever to pull down the knob, if the striker incompletely engages with the hook.

5. A seat back lock as claimed in claim 3 wherein the locking mechanism further comprises an opening lever pivotally mounted to the base plate with a fourth spring, the opening lever being operable to disengage the hook from the striker.

6. A seat back lock as claimed in claim 5 wherein the hook has a rear projection and the opening lever has an arm rotating to contact the rear projection of the hook to disengage the hook from the striker.

7. A seat back lock as claimed in claim 3 wherein the binding lever has a front projection and the warning lever has a lower edge, and wherein, if the striker disengages from the hook, the front projection of the binding lever contacts the lower edge of the warning lever and moves up the warning lever to pull down the knob.

8. A seat back lock as claimed in claim 3 wherein the warning lever is connected to the knob via a bell crank pivotally mounted to a center of the seat back with a fifth spring.

9. A seat back lock as claimed in claim 8 wherein the opening lever is connected to a front end of the bell crank via a second connecting member and the warning lever is connected to the front end of the bell crank via a third connecting member.

10. A seat back lock as claimed in claim 9 wherein the bell crank has first and second arcuate grooves positioned at the front end and arranged in a circle around a center of the bell crank, the second connecting member joined to the opening lever being fitted in the first arcuate groove with play, the third connecting member joined to the warning lever being fitted in the second arcuate groove with play.

11. A seat back lock as claimed in claim 1 wherein the knob further comprises a guide member and wherein an indicator appears in the guide member of the knob to show that the striker disengages from the hook when the knob is retracted down.

12. A seat back lock as claimed in claim 11 wherein the indicator is colored.

13. A seat back lock as claimed in claim 11 wherein the indicator comprises a word implying unlocking.

14. A seat back lock as claimed in claim 11 wherein a top of the knob is almost coplanar with a top of the guide member when the striker engages with the hook.

15. A seat back lock for locking and unlocking a seat back in a vehicle, comprising:
    a striker mounted to a body of the vehicle;
    a locking mechanism mounted in the seat back and having
        a cover plate,
        a base plate covered with the cover plate,
        a hook that is engagable with the striker to allow the seat back to be held in a standing position, the hook being pivotally mounted to the cover plate with a second spring and positioned between the base plate and the cover plate,
        an opening lever pivotally mounted to the base plate with a first spring, the opening lever being operable to disengage the hook from the striker, and
        a detecting unit detecting incomplete engagement and disengagement between the striker and the hook, the detecting unit comprising a binding lever pivotally mounted to the cover plate with a third spring and a warning lever pivotally mounted to the cover plate with a fourth spring, a rear end of the binding lever contacting the striker against the force of the third spring when the striker engages with the hook; and
    an operating unit provided on a top of the seat back and having an operating knob that can be pushed down to allow the seat back to move from the standing position to a folding position, the operating knob being connected to the warning lever and being operable when the detecting unit detects incomplete engagement or disengagement between the striker and the hook.

16. A seat back lock for locking and unlocking a seat back in a vehicle, comprising:
   a striker mounted to a body of the vehicle;
   a locking mechanism mounted in the seat back and having
      a cover plate,
      a base plate covered with the cover plate,
      a hook having a rear projection and being engagable with the striker to allow the seat back to be held in a standing position, the hook being pivotally mounted to the cover plate with a second spring and positioned between the base plate and the cover plate,
      an opening lever having an arm and being pivotally mounted to the base plate with a first spring, the opening lever being operable to disengage the hook from the striker by rotating the arm to contact the rear projection of the hook, and
      a detecting unit detecting incomplete engagement and disengagement between the striker and the hook, the detecting unit comprising a binding lever pivotally mounted to the cover plate with a third spring and a warning lever pivotally mounted to the cover plate with a fourth spring, a rear end of the binding lever contacting the striker against the force of the third spring when the striker engages with the hook; and
   an operating unit provided on a top of the seat back and having an operating knob that can be pushed down to allow the seat back to move from the standing position to a folding position, the operating knob being connected to the warning lever and being operable when the detecting unit detects incomplete engagement or disengagement between the striker and the hook.

17. A seat back lock for locking and unlocking a seat back in a vehicle, comprising:
   a striker mounted to a body of the vehicle;
   a locking mechanism mounted in the seat back and having
      a cover plate,
      a base plate covered with the cover plate,
      a hook that is engagable with the striker to allow the seat back to be held in a standing position, the hook being pivotally mounted to the cover plate with a second spring and positioned between the base plate and the cover plate,
      an opening lever pivotally mounted to the base plate with a first spring, the opening lever being operable to disengage the hook from the striker, and
      a detecting unit detecting incomplete engagement and disengagement between the striker and the hook, the detecting unit comprising a binding lever pivotally mounted to the cover plate with a third spring and a warning lever pivotally mounted to the cover plate with a fourth spring, a rear end of the binding lever contacting the striker against the force of the third spring when the striker engages with the hook; and
   an operating unit provided on a top of the seat back and having an operating knob that can be pushed down to allow the seat back to move from the standing position to a folding position, the operating knob being operable when the detecting unit detects incomplete engagement or disengagement between the striker and the hook,
   wherein the opening lever and the warning lever are connected to the knob via a bell crank, the opening lever being connected to a front end of the bell crank via a second connecting member and the warning lever being connected to the front end of the bell crank via a third connecting member, wherein the bell crank has first and second arcuate grooves positioned at the front end and arranged in a circle around a center of the bell crank, the second connecting member joined to the opening lever being fitted in the first arcuate groove with play and the third connecting member joined to the warning lever being fitted in the second arcuate groove with play.

* * * * *